(12) United States Patent
Nising

(10) Patent No.: US 7,625,953 B2
(45) Date of Patent: Dec. 1, 2009

(54) METHOD AND PLANT FOR THE MANUFACTURE OF POLYMER PARTICLES

(75) Inventor: Philip Nising, Pfungen (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 11/982,902

(22) Filed: Nov. 6, 2007

(65) Prior Publication Data
US 2008/0249199 A1  Oct. 9, 2008

(30) Foreign Application Priority Data
Nov. 23, 2006  (EP) .................... 06124631

(51) Int. Cl.
*C08J 11/04* (2006.01)

(52) U.S. Cl. ............... 521/40; 521/50; 521/56; 521/61; 521/49

(58) Field of Classification Search ............. 521/40, 521/50, 82, 47, 81, 41, 48, 40.5, 42.5, 49, 521/56, 61; 528/480, 272; 525/50, 55, 191, 525/240; 524/474; 264/37.1, 40.7
See application file for complete search history.

(56) References Cited

U.S. PATENT DOCUMENTS
6,783,710 B1 * 8/2004 Walder ................ 264/40.7

FOREIGN PATENT DOCUMENTS
| DE | 15 69 024 A1 | 9/1969 |
| EP | 0 638 017 A1 | 2/1995 |
| EP | 0 668 139 A1 | 8/1995 |
| JP | 06 166115 A | 6/1994 |

OTHER PUBLICATIONS
Machine translation of JP-06-166115.*
* cited by examiner

*Primary Examiner*—Ling-Siu Choi
*Assistant Examiner*—Frances Tischler
(74) *Attorney, Agent, or Firm*—Francis C. Hand; Carella, Byrne, Bain

(57) ABSTRACT

The method for the manufacture of foamed or foamable polymer particles employs a mixture of a polymer melt and a recycled polymer melt produced from recycled, propellant-containing polymer particles. The associated plant for the manufacture of the foamed or foamable polymer particles is provided with an apparatus for the processing of recycled, propellant-containing polymer particles.

12 Claims, 1 Drawing Sheet

METHOD AND PLANT FOR THE MANUFACTURE OF POLYMER PARTICLES

Figure 1:
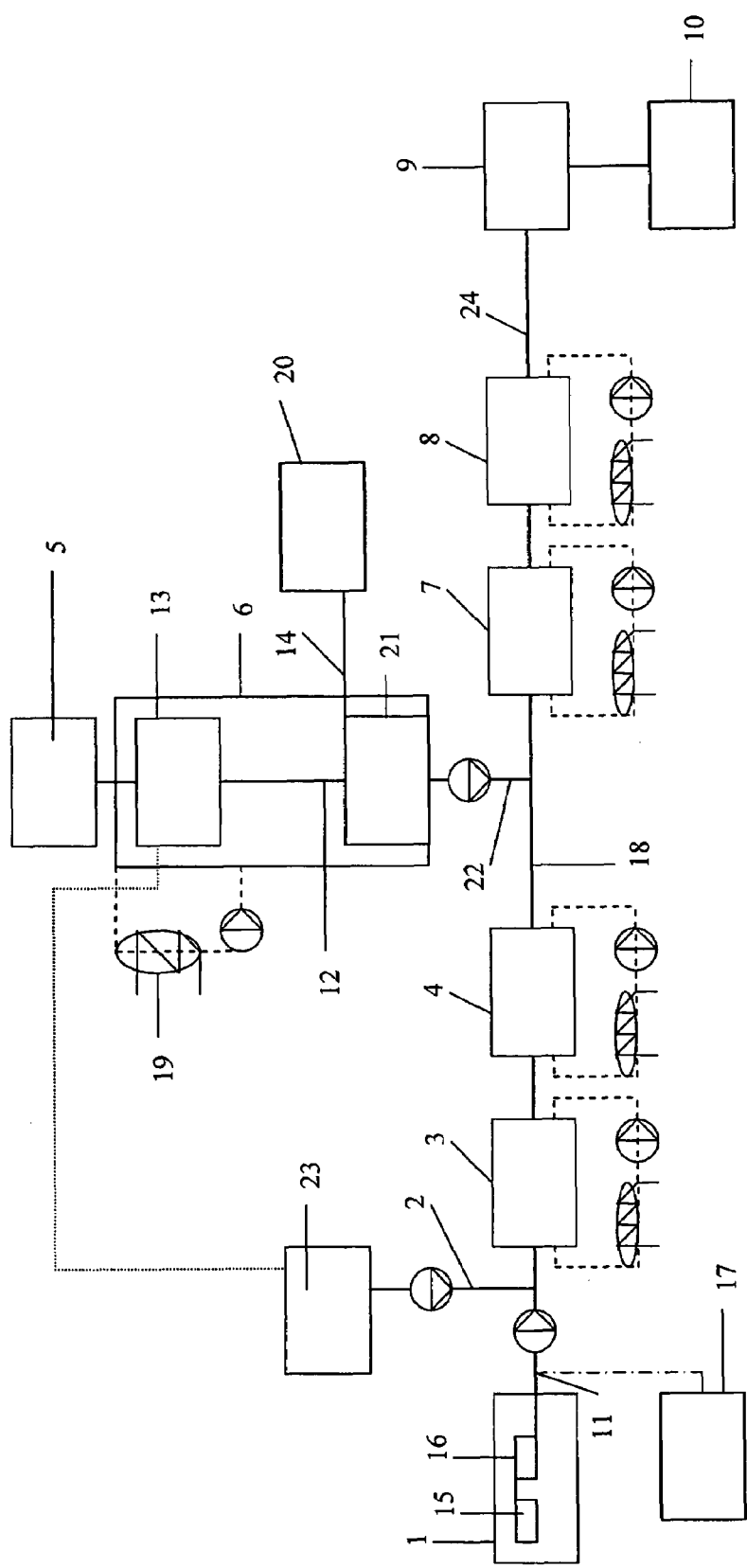

This invention relates to a method and plant for the manufacture of polymer particles. More particularly, this invention relates to a method and plant for the manufacture of foamed or foamable polymer particles.

A method or a facility for the manufacture of foamed or foamable polymer particles is known from EP-A-0 668 139. In accordance with this method, a fluid propellant (also referred to in the art as an expanding agent or foaming agent) is dispersed in a polymer melt. The dispersal is carried out by means of static mixing elements with a high shearing of the melt and with the formation of fine droplets of propellant. The mixture is exposed to a small shearing in a following method step by means of further static mixing elements, with the propellant being dissolved in the melt. Thereafter, a cooling down of the mixture takes place, after which the mixture is extruded through nozzles, so that strands are formed which are cooled abruptly following the nozzles. This prevents the propellant initiating a foaming process in the strands. The strands are comminuted to a granulate form by means of a granulator.

A granulate manufactured by the above process thus contains a known amount of fluid propellant and is accordingly a foamed or foamable polymer particle. The propellant diffuses out of the polymer particles in the course of time during storage. Thus, after a longer period of storage of the granulate, each of the polymer particles contains a non-uniform residual quantity of fluid propellant, due to which the specifications for the further processing of the granulate to an article of foamed polymer can no longer be met. Granulate of this kind could not be recycled hitherto because the remaining quantity of fluid propellant could not be calculated.

One problem in the manufacture of foamable polymer particles, such as for example EPS, by means of a suspension process, is the occurrence of a proportion of products which do not meet the specifications, a so-called "off-spec" proportion of the products. Depending on the process parameters, this proportion of the products, which is non-usable on account of their particle size for example, can amount to 5% to 20% of the product manufactured by the suspension process. As a rule these off-spec proportions of the products are separated by means of screening and are disposed of thermally, which has a clearly negative effect of the economy of the whole procedure.

The limited storability of the polymer particles containing propellant is a further problem existing in the manufacture of foamable polymer particles by means of the suspension method. Polymer particles which have been stored too long lose propellant continuously during storage by the above described diffusion process, which leads to a large amount of no longer saleable product, since the latter contains too little propellant.

A recycling of the proportion of the product which no longer meets the specifications for the further processing to foamed polymer articles is not possible in the suspension process due to the process characteristics and is also only limitedly possible quantitatively in the hitherto described methods which are based on extrusion (WO03106544 A2). One problem is the often non-uniform residual quantity of propellant in the particles of such a proportion of the product.

A method for the processing of recycled polymer is known from EP0638017 B1. This recycled polymer arises from so-called gassed plastic material, such as foamed polystyrene for example. In the associated plant, the previously comminuted, granulated and compacted recycled polymer is melted, filtered, degassed and gassed again by mixing with propellant gas. The re-gassing is carried out on the degassed plastic material prior to the granulating step using a gaseous propellant. The propellant is fed to the degassed recycled polymer melt following a melt pump prior to or in a mixer. In this way, the amount of plastic material conveyed by the melt pump per unit of time can be monitored and propellant can be supplied in a metered addition in correspondence to the amount of plastic material conveyed. It is necessary for the corresponding metering of the propellant gas that the volume of propellant gas introduced into the plastic material per unit of time and the mixing volume processed during the mixture per unit of time be regulated proportionally to the volume of plastic material supplied per unit of time of the gasification.

The plant in accordance with EP0638017 admittedly offers the possibility of processing a recycled polymer with a reduced number of plant components in comparison with the prior art; however, the plant is correspondingly more complicated as regards the control. In order to counter these disadvantages and to be able to use the plant in a more universal manner, as well as to process recycled polymer containing propellant in the plant in addition to polymer melts and simultaneously to mix additives in the manner of a master batch, the method can, however, only be used with further investments in the control.

It is the object of the invention to create an improvement of the known methods so that polymer particles with an unknown content of propellant can be used for the manufacture of foamed or foamable polymer particles.

It is another object of the invention to adapt a proven plant for an economical manufacture of foamable polymer particles.

Briefly, the present invention relates to a method for the reprocessing of polymer particles loaded with propellant, independent of their particle size and shape, for the renewed manufacture of foamable polymer particles which possess a particle size distribution in accordance with the desired specifications. Loaded with propellant in the sense of the invention means compact polymer particles which have not yet been subjected to a further processable pre-foaming process, the propellant portion of which amounts from approximately 0.1 to 10 weight percent. These particles to be recycled can either be off-spec proportions of products from suspension polymerization, for example, or polymer particles containing propellant which have been stored too long out of which considerable parts of the propellant have diffused and which can accordingly no longer be marketed or used commercially.

In accordance with the invention, a plant is provided for an economical manufacture of foamable polymer particles, in particular EPS particles, in such a way that at least one part of the polymer used is added as recycled polymer, which in addition to an adjustable propellant content also has additives. These additives are added to the previously degasified recycled polymer and mixed with the recycled polymer, so that an additive-containing recycled polymer is obtained in a side flow, which is fed to the polymer melt according to the principle of a master batch.

As is known from Ullmann's Encyclopedia of Industrial Chemistry, additives with monomer functions can be incorporated chemically into a plastic if they are introduced before polymerization. In the case of agents added before processing, the use of "masterbatches" (i.e., granular products containing the concentrated additive in a polymer vehicle is often advisable.

See also, http://www.pmb.co.uk/masterbatch.htm: Masterbatch is a concentrated mixture of pigments and/or additives encapsulated during a heat process into a carrier resin which is then cooled and cut into a granular shape.

Thus, using this method, foamed or foamable polymer particles can be obtained, which meet the desired specifications.

In accordance with the method for the manufacture of foamed or foamable polymer particles from a polymer melt and a recycled polymer melt at least one part of the recycled polymer melt is produced from recycled, propellant-containing polymer particles.

The recycled, propellant-containing polymer particles are melted in an extruder, in particular in a twin screw extruder or multiple screw extruder, to a recycled polymer melt. Propellant contained in the recycled, propellant-containing polymer particles is, if necessary, removed from the recycled polymer melt in a degasification apparatus. At least one additive, (for example a flame protection agent, a nucleating agent, a softener, a UV protection agent or an insecticide, a propellant, a lubricant, a pigment, graphite or carbon black particles, metal particles or a mixture of the named substances) is added in metered form to the recycled polymer melt downstream of the degasification apparatus, either in liquid or solid form or in the form of a master batch. This has the advantage that one is able to use the additive or additives directly, i.e. in pure or concentrated form and can do without the use of large quantities of master batch. In this way, the method becomes considerably more economical, since master batches are very expensive as a rule. By the introduction of the additives into the recycled polymer melt, a so-called master batch can be manufactured "in situ" based on a recycled material.

The polymer melt is either produced directly in a polymerisation plant, which includes a reactor and a degasification apparatus, or by the melting of polymer granulate in a melting apparatus. The polymer melt is loaded with a fluid propellant, so that a propellant-containing polymer melt is obtained, with the propellant being dispersed in a following mixing apparatus and homogenised. A cooling of the propellant-containing polymer melt takes place in a cooling apparatus.

The propellant-containing polymer melt and the additive-containing recycled polymer melt are amalgamated, i.e. mixed, and homogenised in a following mixing apparatus to form a homogeneous polymer melt that is then subjected to a granulating step, which is carried out by means of a granulator, in particular by means of an underwater granulator. Mainly spherical or ellipsoid particles are produced by means of the granulating apparatus.

A plant for the manufacture of foamed or foamable polymer particles is provided with an apparatus for the processing of recycled, propellant-containing polymer particles. The apparatus includes an extruder which contains a heating means for the production of a recycled polymer melt from the recycled, propellant-containing polymer particles, a degasification apparatus for the degasification of the recycling polymer melt and a mixing apparatus for the through mixing of the recycled polymer melt, so that an essentially homogenous recycled polymer melt can be obtained.

The extruder is designed as a side extruder.

A metering apparatus is also provided for the admixture to the recycled polymer melt of at least one additive (for example a flame protection means, a nucleating agent, a softener, a UV protection agent or an insecticide, a propellant, a lubricant, a pigment, graphite or carbon black particles, metal particles or a mixture of the named substances).

The plant includes a polymerisation plant for the manufacture of a polymer melt, wherein the polymerisation plant has a reactor and a degasification apparatus for the manufacture of the polymer melt by the melting of polymer granulate. A supply apparatus and also a mixing apparatus and/or a cooling apparatus are provided downstream of the polymerisation plant or of the melting apparatus for the metering of a propellant. The mixing apparatus contains a static mixer and the cooling apparatus contains a static mixer/heat exchanger.

A static mixer/heat exchanger is an apparatus, which is basically constructed in a manner similar to a usual tube bundle heat exchanger, the installed components of which have an increased mixing effect of the cooling medium. This can, for example, be achieved by means of the design and arrangement of the tubes containing the cooling medium or by means of additional sheet metal guides. Typical representatives of such mixers/heat exchangers are described in the patent specifications EP1067352B1, EP0009638 and EP1268026 for example.

A mixing apparatus and/or a cooling apparatus is provided, to which the additive-containing recycled polymer melt and the propellant-containing polymer melt can be conveyed and can be mixed through and together. The mixing apparatus contains a static mixer, the cooling apparatus contains a static mixer/heat exchanger.

A foamed or foamable polymer particle, obtainable by means of the above-described method, comprises a mixture of a recycled polymer melt and a propellant-containing polymer melt, wherein the proportion of recycled polymer melt lies between 0.5% and 100%. The recycled polymer melt consists of a true to type propellant-containing polymer.

The recycled polymer melt and/or the propellant-containing polymer melt contain an additive. The additive includes a flame protection agent, a lubricant, a nucleating agent, a softener, a UV protection agent, an insecticide, a pigment and/or graphite and/or carbon black particles and/or metal particles, a master batch or a mixture of the named substances.

These and other objects and advantages of the invention will become more apparent from the following detailed description taken in conjunction with the accompanying drawings wherein:

FIG. 1 illustrates a schematic of a plant for the manufacture of foamed or foamable polymer particles in accordance with the invention.

Referring to FIG. 1, the illustrated plant operates to manufacture foamed or foamable polymer particles 10 from a polymer melt 11 and a recycled polymer melt 12 at least one part of which melt 12 is produced from recycled, propellant-containing polymer particles 5.

In accordance with an advantageous sequence of the method, the recycled, propellant-containing polymer particles 5 are melted in an extruder 6, in particular in a twin screw extruder or multiple screw extruder, to form the recycled polymer melt 12.

Propellant contained in the recycled, propellant-containing polymer particles is, if necessary, removed from the recycling polymer melt 12 in a degasification apparatus 13.

A metered addition of an additive 14 from a metering apparatus 20 is made to the recycled polymer melt 12 downstream of the degasification apparatus 13, either in liquid or solid form or in the form of a master batch. In addition, a mixing apparatus 21 is provided for the thorough mixing of the recycled polymer melt 12 so that an essentially homogenous recycled polymer melt 22 can be obtained.

In accordance with a further method variant, a transport device (not shown) is provided by means of which a compacted granulate of an already foamed plastic, which is present as foamed polymer articles, can be recycled. The compacted granulate is obtained by shredding of the foamed polymer articles so that polymer particles 5 are produced and then compacted in a subsequent method step. The density is increased so that the recycled polymer particles 5 are present as compacted granulate. The compacted granulate is transported in the transport device to the extruder 6, in which the further method steps described above take place.

In accordance with a further method variant, a transport device (not shown) is provided for recycling polymer which is dissolved in a solvent. In this case, the recycled polymer particles 5 are already present as a liquid solution, so that the step of the melting can be omitted. Propellant contained in the recycled polymer particles 5 is, if necessary, removed from the recycling polymer melt together with the solvent in the degasification apparatus 13, which is suitable for the processing of solutions, which contain recycled, propellant-containing polymer particles 5.

It goes without saying that the above method variants can also be combined, so that a desired mixture of recycled, propellant-containing polymer particles 5, compacted granulate of an already foamed plastic and recycled polymer which is dissolved in a solvent can be processed.

Propellant and/or solvent is removed from the recycled polymer melt or the solution with the recycled, propellant-containing polymer particles by means of the degasification apparatus 13. The pressure in the recycled polymer melt is advantageously lowered, so that the propellant present in the recycled polymer melt in dissolved form nucleates and forms blisters. The degasification apparatus 13 is operated in particular under vacuum conditions at pressures in the region of 30 to 100 mbar.

The polymer melt 11 is either produced directly in a polymerisation plant 1, which includes a reactor 15 and a degasification device 16, or by melting of polymer granulate in a melting apparatus 17.

The polymer melt 11 is loaded with a fluid propellant 2, so that a propellant-containing polymer melt 18 is obtained, with the propellant 2 being dispersed and homogenised in a following mixing apparatus 3. A cooling of the propellant-containing polymer melt takes place in a cooling apparatus 4.

The propellant-containing polymer melt 18 and the recycled polymer melt 22 are brought together and dispersed and homogenised in a following mixing apparatus 7 and then cooled in a cooling apparatus 8. The propellant-containing polymer melt 18 and the recycled polymer melt 22 are jointly processed as a polymer melt 24 to foamed or foamable polymer particles 10 in a granulating step, which is carried out by means of a granulating apparatus 9, in particular by means of an underwater granulator. Predominantly spherical or ellipsoid particles are produced by means of the granulating apparatus 9.

In this arrangement, a particle with at least approximately ellipsoidal geometry is termed ellipsoid when, on an orthogonal coordinate system placed by its center of gravity, on the assumption of a homogeneous mass distribution, a dimension a on the first axis (x-axis), a dimension b on the second axis (y-axis) and a dimension c on the third axis (z-axis) are measurable and the ratio of the longest dimension a to the shortest dimension (b or c) is greater than 1.25. The dimensions a, b, c are also termed the half axes of the ellipsoid. If the ratio of the greatest dimension a to the shortest dimension (b or c) is smaller than or equal to 1.25 the particle is termed spherical. The predominantly spherical or ellipsoid particles differ from particles resulting from other manufacturing processes, such as suspension polymerisation, if an underwater granulator according to the invention is used such that they are provided with a cutting edge, which results from the cutting procedure and which is visible e.g. under a microscope.

A thermal treatment of the particles can follow the granulating step to have the cutting edges disappear and the roundness of the particles improved. This thermal treatment can also have an advantageous effect on the resulting foam structure. The thermal treatment substantially consists of holding the particles at a defined temperature and a defined pressure, so that a foaming of the particles, which contain propellant, is avoided. The temperature should lie between 50° and 150° Celsius, preferably between 70° and 120° Celsius. Depending on the temperature used, a pressure of 10 to 20 bars is necessary to preclude a foaming of the particles. The duration of the thermal treatment lies between 1 and 60 minutes, preferably between 1 and 30 minutes, particularly preferable between 5 and 20 minutes. The treatment can either be in batch mode in a mixing vessel or continually directly following the granulation, in the case of an underwater granulation preferably still in the same water cycle and before the drying stage. Particular surface-active additives can be added to the water, for example a polyvinylalcohol, in order to avoid gluing of the particles together during the thermal treatment. The solids portion should amount to about 30 to 50% during the treatment.

Referring to FIG. 1, a plant for the manufacture of the foamed or foamable polymer particles 10 is provided with a means for the processing of recycled, propellant-containing polymer particles 5. The means includes the extruder 6, which contains a heating means 19 for the production of a recycled polymer melt 12 from the recycled, propellant-containing polymer particles 5, the degasification apparatus 13 for the optimal degasification of the recycled polymer melt 12, and the mixing apparatus 21 for the thorough mixing of the recycled polymer melt 12 so that an essentially homogenous recycled polymer melt 22 can be obtained.

The extruder 6 is designed as a side extruder and optionally includes the degasification apparatus 13. This may be necessary should the amount of propellant which is supplied to the polymer melt 11 with the side flow be so large in total and/or vary in concentration such that fluctuations in the concentration of propellant in the polymer melt 24 which are no longer negligible result. Following degasification, the recycled polymer melt 12 is essentially free from propellant.

The metering apparatus 20 is provided downstream of the degasification apparatus 13 for the mixing of the recycled polymer melt 12 with an additive 14. The use of a twin screw extruder or multiple screw extruder as a side extruder 6 is particularly advantageous because the additive 14, which may also be a mixture of additives, can be mixed directly with the recycled polymer melt, as a result of which the introduction of the additive 14 or a mixture of the same is made easier. This procedural method is considerably more economical than the use of a bought-in master batch, since the latter would be too expensive as a rule for an economical operation of the method in accordance with the invention.

The plant includes a polymerisation plant 1 having a reactor 15 and a degasification apparatus 16 for the manufacture of the polymer melt 11 or a melting apparatus 17 for the manufacture of the polymer melt by melting of polymer granulate.

A supply apparatus 23 and a mixing apparatus 3 and/or a cooling apparatus 4 are provided downstream of the polymerisation plant 1 or of the melting apparatus 17 for the metering of a propellant 2 via a system control. The amount of propellant 2 can be automatically adapted in such a way that the propellant load in the polymer melt 24 (sum of the polymer melt 18 and the recycling polymer melt 22) corresponds to the desired propellant load. The mixing apparatus 3 contains a static mixer and the cooling apparatus 4 contains a static mixer/heat exchanger.

A mixing apparatus 7 and/or a cooling apparatus 8 is provided, to which the additive-containing recycled polymer melt 22 and the propellant-containing polymer melt 18 can be supplied and mixed together. The mixing apparatus 7 contains a static mixer by means of which the polymer melt 24 consisting of the propellant-containing polymer melt 18 and the recycled polymer melt 22 is produced, which has an essentially homogenous distribution of propellant 2 and also additive(s) 14. In this connection, the mention of a static mixer should not be understood as being limited to one single static mixer, but can also include a plurality of static mixers connected in parallel or in series. Shearing forces which are as low as possible should be transmitted to the polymer melt and/or to the recycling polymer melt by the static mixer or mixers.

Following the mixing apparatus 7, a cooling of the polymer melt 24 made of polymer melt 18 and recycled polymer melt 22 takes place in the cooling apparatus 8, which contains a static mixer/heat exchanger.

Following the cooling apparatus 8, the polymer melt 24 is formed in a granulator 9, for example in an underwater granulator, into foamed or foamable polymer particles 10, in particular to spherical or ellipsoidal granulate. The polymer melt 24 is conveyed via a nozzle plate, which mainly contains a plurality of bores. A strand of polymer forms on passing through a bore of this kind. The system control controls a cutting means for carrying out the granulating step, which is arranged directly after the nozzle plate and by means of which the polymer strand can be cut through periodically, so that foamed or foamable polymer particles 10 can be produced from the polymer strand. The granulating step is carried out in the underwater granulator with a liquid (preferably water, but for example, also brine), which is used as a cooling and transport means for the granulate. A raised pressure can also be exerted with the liquid used in the granulating step, as a result of which an inflating effect of the propellant in the not yet solidified granulate can be suppressed at least partially. At the same time, the polymer strands and the granulate are subjected to cooling, so that the polymer strand or string present as a melt solidifies and the distribution of the additives in the polymer strand and in the foamed or foamable polymer particles present as granulate is "frozen".

Moreover, by means of the system control, the melt viscosity is regulated as a parameter of the polymer melt 24, as well as a predetermined temperature and pressure profile in the mixing apparatus 7 and also in the cooling apparatus 8, and also in the upstream parts of the plant for generation of the polymer melt 18 and of the recycled polymer melt 22. These parameters of the polymer melt 24 and also of the previously described parts of the plant serve for the optimisation of the homogeneity of the propellant and the additives in the polymer melt 24 and also serve to achieve an ideal granulating ability.

When using underwater granulation as a granulating method there are often problems of instability at the apertured plate which are due to the fact that the polymer melt 24 solidifies in one or more of the holes due to an increased cooling on the liquid side. This has the result that the foamed or foamable polymer particles 10 have non-uniform dimensions and no longer meet the desired specifications. In order to prevent this "freezing up" of the bores, it has to be ensured, on the one hand, that the temperatures (temperature fields) are the same for all the nozzles. This takes place with the help of an apertured plate heating device which is precisely regulated by the system control and which can either comprise an oil heater, an electric heater, or a combination of both. In the case of an electric heater, the apertured plate is permeated with a plurality of heating cartridges which ensure a uniform temperature.

The apertured plate can additionally be coated in such a way on the water side that a cooling of the apertured plate at the surface and thus losses of heat which lead to a freezing up of the holes can be avoided or at least minimised. This coating can be made of ceramic for example or of a combination of different metals or metal oxides.

On the other hand, on entering the apertured plate, the polymer melt has to adopt a temperature and a pressure, the value of which has to be adjusted in relation to the operating state of the plant. Via the system control, the temperature T and the pressure p are so influenced on entering the apertured plate that these parameters adopt values which are as close to desired values as possible.

The water cycle of the underwater granulator can be configured such that the particles produced in the granulating step are subjected even before drying to a defined residence time at a defined temperature which is needed for the thermal treatment of the particles for improvement of the shape or the foaming behavior. This result can either be achieved by an enlargement of the cross-section or by a longer, straight or curved tubular conduit. In order to bring the temperature to the desired level, a heat exchanger can be built into the tubular conduit or the mentioned enlargement of the cross-section can be foreseen as a reaction tube with heat exchanger tubes arranged inside thereof, e.g. a Sulzer SMR™ reactor. Alternatively, a direct heating, e.g. by adding vapor via a nozzle, can be foreseen.

Diverse foamed or foamable polymer particles 10 can be produced (depending on the diameter and the number of the bores, the speed of rotation and the number of the cutting means and the liquid pressure at the outlet of the bores), with the granulate being able to be produced in particular in the form of "pellets" or "beads" or as a partially foamed granulate. By optimising the named parameter settings, foamed or foamable polymer particles can preferably be produced in at least approximately spherical or elliptical shape.

Using gaseous and or supercritical propellants, such as nitrogen or carbon dioxide for example, the foamed or foamable polymer particles 10 can be partially or completely foamed directly at the outlet of the apertured plate. The process parameters for the granulation and subsequent drying are to be adapted accordingly.

In addition to polystyrene, other plastics can be used for the manufacture of the foamed or foamable polymer particles 10. Examples are: styrene copolymers, impact-proof polystyrene, polyolefin, in particular polyethylene and also polypropylene, biologically degradable polymers or a mixture of these materials.

A foamed or foamable polymer particle 10, obtained by means of the previously described method, comprises a mixture of a recycled polymer melt (12, 22) of recycled propellant-containing polymer particles 5 and a propellant-containing polymer melt 18, wherein the proportion of recycled polymer melt is between 0.5% and 100%. The recycled polymer melt (12, 22) comprises a true to type propellant-containing polymer, i.e. one type of propellant containing polymer. The recycling polymer melt (12, 22) and/or the propellant-containing polymer melt 18 contain an additive 14. The additive 14 includes a flame protection agent, a lubricant, a nucleating agent, a softener, a UV protection agent, an insecticide, a pigment and/or graphite and/or carbon black particles and/or metal particles, a master batch and also a mixture of the named substances. The additives can be added in highly concentrated form, in pure form or in the form of a master batch.

If bromide-containing flame protection means or other thermally unstable additives are present in the recycled, propellant-containing polymer particles 5, or if such additives 14 are added later, the process temperature in the extruder 6 and also in all following system components may not exceed a temperature and dwell time limiting value which is defined by the thermal stability of the substance.

The foamable or foamed polymer particles according to the invention are disposed with a more or less prominent cutting edge, which results from the cutting process during the underwater granulation. To eliminate this cutting edge and to improve the roundness of the particles in general, the particles containing propellant are subjected to a thermal treatment. Such thermal treatment is used also to improve the foaming characteristic of the particles.

What is claimed is:

1. A method for the manufacture of foamed or foamable polymer particles comprising the steps of
    melting a mass of recycled propellant-containing foamable polymer particles;
    removing propellant from the melted mass;
    adding a metered amount of additive to the melted mass to form an additive-containing recycled polymer melt;
    forming a polymer melt;
    adding a metered amount of propellant to said polymer melt to form a propellant-containing polymer melt;
    mixing the additive-containing recycled polymer melt and the propellant-containing polymer melt to obtain a homogeneous polymer melt with a homogeneous distribution of propellant and additive;
    thereafter cooling the homogeneous polymer melt; and
    granulating the cooled homogeneous polymer melt into a plurality of polymer particles.

2. A method as set forth in claim 1 wherein the additive is added to the melted mass of recycled propellant-containing polymer particles after removal of propellant therefrom in one of a liquid form, a solid form and a master batch form.

3. A method as set forth in claim 1 wherein said step of granulating the cooled homogeneous polymer melt occurs under water.

4. A method as set forth in claim 3 wherein said step of granulating the cooled homogeneous polymer melt produces predominantly spherical or ellipsoid particles.

5. A method as set forth in claim 4 wherein the spherical or ellipsoid particles comprise a cutting edge.

6. A method as set forth in claim 4 further comprising the step of thermally treating the produced particles for improving the roundness of the particles.

7. A method as set forth in claim 1 wherein the proportion of recycled polymer melt in the homogeneous polymer melt is between 0.5% and 100%.

8. A method as set forth in claim 1 wherein the additive includes at least one of a flame protection agent, a lubricant, a nucleating agent, a softener, a UV protection agent, an insecticide, a pigment, graphite and/or carbon black particles, metal particles, a master batch and a mixture thereof.

9. A polymer particle made in accordance with the method of claim 1 characterized in having a cutting edge.

10. A method for the manufacture of foamed or foamable polymer particles comprising the steps of
    melting a mass of recycled propellant-containing polymer particles in a first step in an extruder;
    removing propellant from the melted mass of said first step in a second subsequent step;
    adding a metered amount of additive in a third step subsequent to said second step to the melted mass to form an additive-containing recycled polymer melt;
    melting polymer particles in a melting apparatus to form a polymer melt in a fourth step occurring in parallel to said first step;
    adding a metered amount of propellant in a fifth step subsequent to said fourth step to said polymer melt to form a propellant-containing polymer melt;
    mixing the additive-containing recycled polymer melt and the propellant-containing polymer melt in a sixth step subsequent to said fifth step to obtain a homogeneous polymer melt with a homogeneous distribution of propellant and additive;
    thereafter cooling the homogeneous polymer melt; and
    granulating the cooled homogeneous polymer melt into a plurality of polymer particles.

11. A method as set forth in claim 1 wherein the additive is added to the melted mass of recycled propellant-containing polymer particles after removal of propellant therefrom in one of a liquid form, a solid form and a master batch form.

12. A method as set forth in claim 10 wherein said polymer melt of said fourth step contains at least one additive.

* * * * *